United States Patent [19]

Kameyama et al.

[11] 4,301,263

[45] Nov. 17, 1981

[54] PRE-COPOLYMER COMPRISING DIALLYL PHTHALATE AND TRIALLYL ISOCYANURATE

[75] Inventors: Akinori Kameyama; Hiroyasu Saito; Jihei Inomata, all of Iwaki, Japan

[73] Assignee: Nippon Kasei Chemical Co., Ltd., Fukushima, Japan

[21] Appl. No.: 92,588

[22] Filed: Nov. 8, 1979

[30] Foreign Application Priority Data

Nov. 18, 1978 [JP] Japan ............................ 53-142702

[51] Int. Cl.³ .................................... C08F 218/18
[52] U.S. Cl. .................................. 526/68; 526/301
[58] Field of Search .................... 526/301, 322, 68

[56] References Cited

U.S. PATENT DOCUMENTS

| | | | |
|---|---|---|---|
| 3,145,194 | 8/1964 | Heckmaier et al. | 526/322 |
| 3,390,116 | 6/1968 | Porret | 526/322 |
| 3,911,192 | 10/1975 | Aronoff et al. | 526/322 |

FOREIGN PATENT DOCUMENTS

| | | |
|---|---|---|
| 665191 | 1/1952 | United Kingdom . |
| 764381 | 12/1956 | United Kingdom . |
| 1017971 | 1/1966 | United Kingdom . |
| 1319627 | 6/1973 | United Kingdom . |

*Primary Examiner*—Harry Wong, Jr.
*Attorney, Agent, or Firm*—Wegner & Bretschneider

[57] ABSTRACT

Disclosed is a pre-copolymer containing diallyl phthalate units and triallyl isocyanurate units.

6 Claims, 6 Drawing Figures

PRE-COPOLYMER COMPRISING DIALLYL PHTHALATE AND TRIALLYL ISOCYANURATE

BACKGROUND OF THE INVENTION

The present invention relates to a copolymeric pre-polymer (hereinafter called as pre-copolymer) consisting of diallyl phthalate (hereinafter abbreviated as DAP) units and triallyl isocyanurate (hereinafter abbreviated as TAIC) units obtained by the radical copolymerization of DAP and TAIC, and to the method of producing the pre-copolymer.

Prepolymer is generally a polymer of relatively low molecular weight having unsaturated bonds in its own molecule, and is generally known as an intermediate substance such as those after molding further polymerized to be the finished polymer, or after adding other monomer(s), a cross-linking agent, etc. and molding further polymerized to be the finished polymer.

Hitherto, as the homopolymeric prepolymer of DAP, prepolymers of diallyl orthophthalate (hereinafter abbreviated as DAOP) or diallyl isophthalate (hereinafter abbreviated as DAIP) have been known and they are used as a molding material because of their favorable stability, and the thus obtained finished polymeric substances are used as a material for several electric parts, for instance, connectors, switches, plugs, magnet cores, base plates for printed circuits because of their excellent electricals properties as well as their moderate heat-stability.

Although these polymeric substances of DAP have the above-mentioned favorable properties, they have still defects in heat-stability in higher temperature conditions such as losing its own weight or thermally decomposing suddenly and violently at a high temperature, and accordingly, their use-conditions are restricted in certain fields of application.

The inventors of the present invention made studies on the improvement of the above-mentioned defects in the finished polymeric materials by adding TAIC monomer in the production of pre-polymer of DAP, and have completed the present invention.

BRIEF EXPLANATION OF THE DRAWINGS

In the drawings,

in FIGS. 1 to 6, the lines, 1, 2, 3, 4, 5, 6, 7, 8, 9 and 12 are the calibration curves. The dot 10 in FIG. 5 shows that the refractive index ($n_D^{25}$) of a mixture of 1.3 moles of DAOP and 0.7 mole of TAIC is 1.5149, and the dot 11 in FIG. 6 shows that the refractive index ($n_D^{25}$) of a mixture of DAOP and TAIC at a molar ratio of 67.5:32.5.

DETAILED DESCRIPTION OF THE INVENTION

Figure 1:
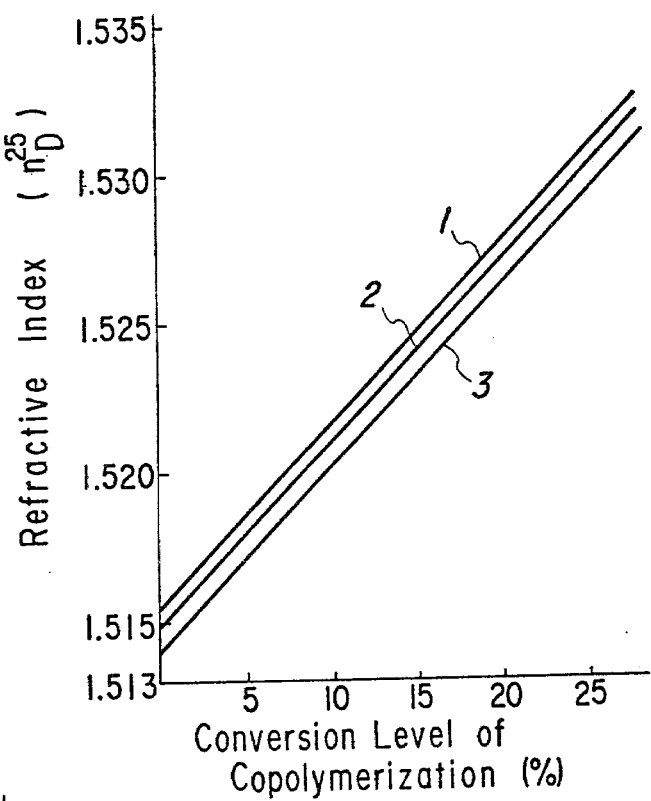
FIG. 1 shows the relationship between conversion level of copolymerization (weight of copolymer formed during a time period divided by weight of monomeric mixture charged into the system, multiplied by 100 and expressed as percentage) and refractive index of the copolymer solution ($n_D^{25}$) for three cases of copolymerization of DAOP and TAIC under different monomer by heating in the presence of oxygen.

That is, in short, the present invention concerns a pre-copolymer comprising DAP units and TAIC units, and the method of producing the pre-copolymer by radical copolymerization of a monomeric mixture of DAP and TAIC on heating in the presence of molecular oxygen or in the presence of radical polymerization initiator (hereinafter called as initiator).

As DAP in the present invention, DAOP and DAIP are used respectively.

As a method of radical copolymerization of DAP and TAIC, the method of heating the monomeric mixture of DAP and TAIC in the presence of oxygen or the method of heating the monomeric mixture in the presence of an initiator is adopted. As molecular oxygen used in the copolymerization without using an initiator, generally an oxygen-containing gas, for instance, air, reinforced enriched oxygen air and gaseous oxygen itself is utilized, and the copolymerization proceeds faster as the concentration of oxygen in the system is larger.

As a method of introducing oxygen into the system of copolymerization, a method of blowing the above-mentioned oxygen-containing gas into the system of copolymerization can be made, however, other than this, another method may be adopted in which an oxygen-containing gas is placed in the upper region of the system of copolymerization and the gas is brought into contact with the liquid comprising the monomeric mixture under agitation, etc.

As the reaction temperature of copolymerization, since it takes much longer period of time for one run of copolymerization at a temperature of lower than 100° C., and the reaction becomes violent at a temperature higher than 300° C., the polymerization temperature is adopted in the range of 100° to 300° C., preferably in the range of 150° to 200° C.

In cases where an initiator is adopted, a usually utilized organic peroxide or an azo compound can be used. For instance, a member selected from the group consisting of lauroyl peroxide, benzoyl peroxide, t-butyl perbenzoate, dicumyl peroxide, azobis-isobutylonitrile, etc. is preferably used. In the case where the polymerization is carried out in the presence of such an initiator, the presence of oxygen is undersirable and it is preferable to carry out the polymerization in an atmosphere of an inert gas, for instance, carbon dioxide or nitrogen. The amount of the initiator used in the copolymerization is not particularly restricted, however, the polymerization proceeds faster as the amount of the initiator is larger and vice versa. Preferably, the amount is 0.1 to 1% by weight of the amount of charged monomer. As the reaction temperature, it is preferable to adopt the temperature at which the initiator generates free radicals.

The heat-stability of finished polymeric substance prepared from the pre-copolymer of the present invention depends upon the amount of TAIC units in the pre-copolymer and amount is the greater, heat-stability is the higher. The effect of TAIC units appears conspicuously from about 5 molar percent of TAIC, and in cases of the combination of DAOP and TAIC, a molar ratio of DAOP:TAIC=95 to 40:5 to 60 is preferable, on the other hand, in the case of the combination of DAIP and TAIC, a molar ratio of DAIP:TAIC=95 to 30:5 to 70 is preferable.

For the copolymeric pre-polymer, a melting point or a softening temperature of 50° to 200° C., a desirable flow property under melted state and a desirable solubility in some sorts of solvent are generally required. Concerning to the softening temperature of the pre-copolymer of the present invention, in the case where the amount of TAIC units is greater than 60 molar percent in the pre-copolymer of DAOP and TAIC, or greater than 70 molar percent in the pre-copolymer of DAIP and TAIC, pre-copolymers having a melting point of higher than 200° C. are produced.

In addition, in the case where the number average molecular weight of the prepolymer is less than 5,000, the conversion of copolymerization of monomeric mixture is too small, and on the other hand, in the case where the number average molecular weight is larger than 15,000, the melting point of the pre-copolymer is higher than 200° C.

Therefore, it is necessary that the pre-copolymer of the present invention has a number average molecular weight of around 5,000 to 15,000 with an uniform composition, and further, that the pre-copolymer does not contain any microgel by cross-linking reaction.

In order to produce the above-mentioned pre-copolymer, it is necessary to determine the conversion level of copolymerization time to time during each run of copolymerization accurately and to stop the reaction of polymerization as soon as possible at the desired given conversion level.

In cases of producing the pre-copolymer comprising DAP units and TAIC units by radical copolymerization of a mixture of DAP and TAIC on heating in the presence of oxygen or in the presence of an initiator, a method of producing the pre-copolymer by stopping the radical copolymerization at the point where the refractive index ($n_D^{25}$), viscosity (centipoise determined at 25° C.), etc. of the reaction mixture attain to the given values obtained from the respective calibration curves which have been prepared in advance is advantageously adopted.

Figure 2:
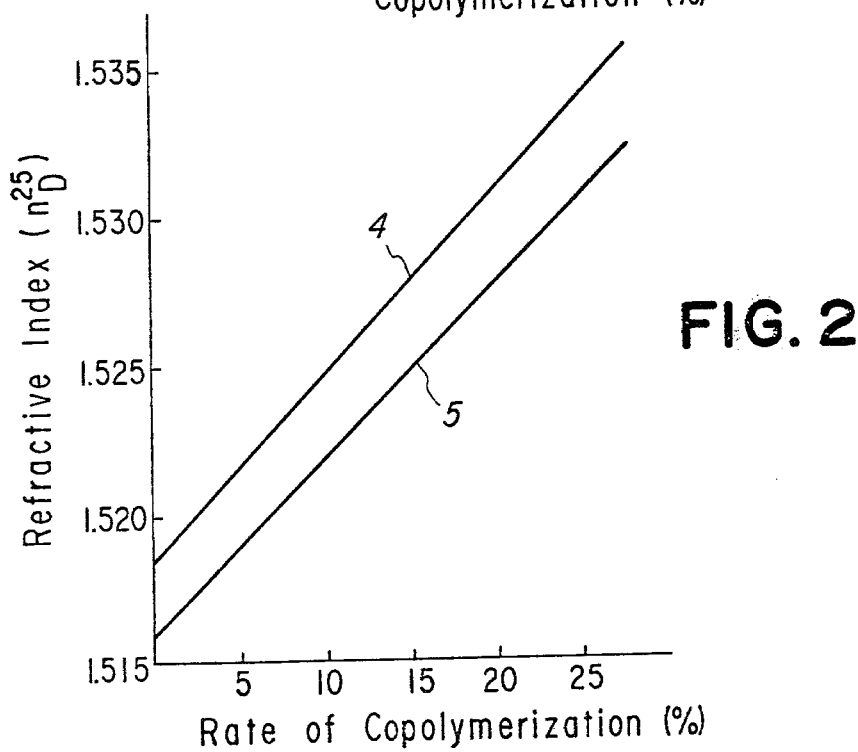
FIG. 2 shows the same relationship in 2 cases of copolymerization of DAIP and TAIC by heating in the presence of oxygen.

For instance, a mixture of DAOP and TAIC with a molar ratio of 1.5:0.5 is brought into copolymerization in the presence of oxygen by heating, and the conversion of copolymerization (%) and the refractive index of the reaction mixture ($n_D^{25}$) are respectively plotted in the abscissa and in the ordinate with the transition of time to give the calibration curve (line 1 in FIG. 1). Also, copolymerization of a mixture of DAOP and TAIC with molar ratio of 1.0:1.0 and the plotting of the conversion of copolymerization in the abscissa and of the refractive index in the ordinate give the calibration curve (line 3 in FIG. 1). In the case of copolymerization of a mixture of DAIP and TAIC with molar ratio of 1.5:0.5, the similar plotting gives the calibration curve (line 4 in FIG. 2). When a mixture of DAIP and TAIC with a molar ratio of 1.0:1.0 is copolymerized, the calibration curve (line 5 FIG. 2) is obtained by the same procedure.

Figure 3:
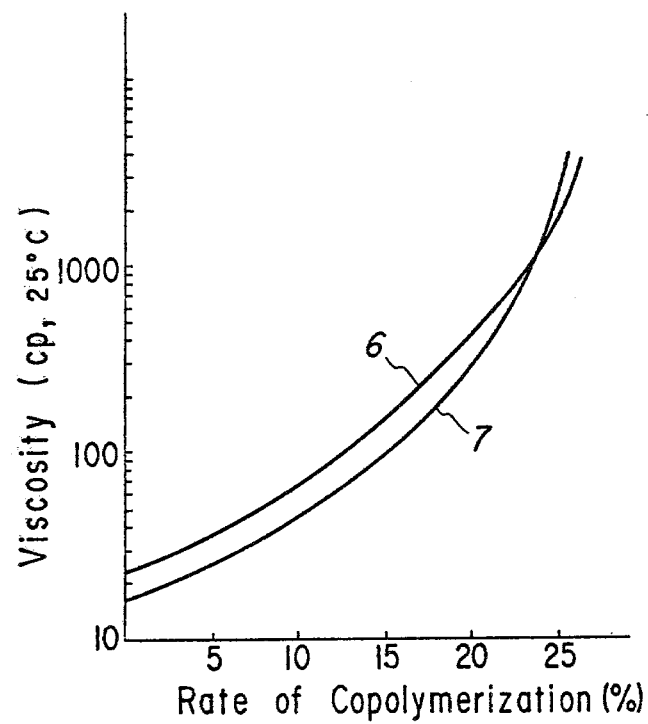
FIG. 3 shows the relationship between conversion level of copolymerization (%) and viscosity (centipoise at 25° C.) of the copolymer solution for two cases of copolymerization of DAIP and TAIC under different monomer ratio by heating in the presence of oxygen.
Figure 4:
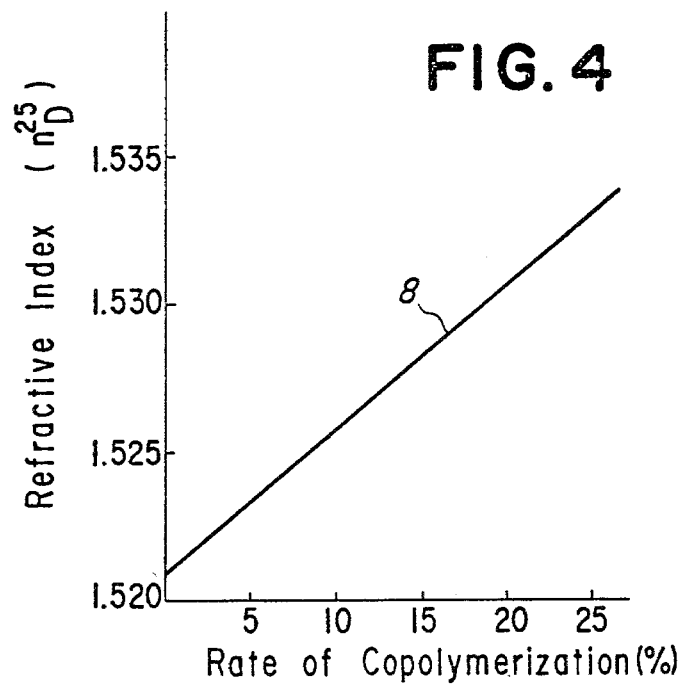
FIG. 4 shows the same relationship as in FIG. 2, however, the copolymerization was carried out in the presence of radical polymerization initiator (hereinafter called as initiator).

However, when a mixture of DAIP and TAIC with molar ratio of 1.5:0.5 is copolymerized, and both the conversion of copolymerization and the viscosity (centipoise, determined at 25° C.) of the reaction mixture are respectively plotted in the abscissa and in the ordinate, then another type of calibration curve (line 6 in FIG. 3) is obtained. The similar procedure in the copolymerization of a mixture of DAIP and TAIC with molar ratio of 1.8:0.2 gives the calibration curve (line 7 in FIG. 3). The line 8 in FIG. 4 is the calibration curve in the copolymerization of a mixture of DAIP and TAIC with molar ratio of 1.5:0.5 by heating in the presence of an initiator, taking the refractive index in the ordinate.

In the case where a copolymerization is carried out on a mixture of, for instance, DAOP and TAIC with molar ratio of 1.5:0.5 by heating in the presence of oxygen and the copolymerization is desired to be stopped at a point where the conversion of copolymerization attained to 25%, the calibration curve (line 1 in FIG. 1) is referred to know that the copolymerization should be stopped when the refractive index of the reaction mixture attains to 1.5309.

As is stated above, once a calibration curve is prepared concerning the conversion of copolymerization vs. the refractive index or the viscosity of the reaction mixture referring to the molar ratio of monomers in the starting monomeric mixture, it is able to know easily the conversion copolymerization from the refractive index or the viscosity of the reaction mixture, i.e., the mixture of monomers and copolymer by referring the calibration curve.

There is another method for preparing the calibration curve, in which an already produced pre-copolymer is added little by little into a monomeric mixture composed of DAP and TAIC at the same molar ratio as that present in the initial stage of copolymerization by which the above-mentioned pre-copolymer was produced and the refractive index and the viscosity of the thus formed mixture (monomeric mixture and copolymeric prepolymer are determined time to time after each addition of pre-copolymer.

In the copolymerization according to the present invention by heating in the presence of oxygen, since no initiator is present in the reaction system, it is easy to stop the copolymerization. That is, the interruption of the supply of oxygen to the copolymerization system and the lowering of the reaction temperature below about 150° C. stops almost completely the proceeding of copolymerization reaction.

From the copolymerization system in which the reaction of copolymerization is stopped, unreacted monomeric DAP and TAIC are removed in the next step. For the easy removal of the unreacted monomers, the copolymerization system is distilled under reduced pressure of less than about 0.5 mmHg at a temperature of lower than about 150° C. in order to prevent the further copolymerization.

Since a small amount of unreacted monomeric DAP and TAIC still remains in the residual raw pre-copolymer after distillation, it is necessary to further remove them. For that purpose, in the next step, a solvent which dissolves monomeric DAP and TAIC but does not dissolve the pre-copolymer of the present invention is added to the raw copolymer remaining after distillation to extract the remaining monomers and recover the pre-copolymer comprising DAP and TAIC units. The recovered pre-copolymer by centrifugation, filtration under suction or filtration under pressure is washed with the solvent, if necessary, and dried to be the product.

The pre-copolymer obtained by the method of the present invention is (1) in the case where DAOP is used, improves the thermal stability of the final polymeric products, and (2) in the case where DAIP is used, has an improved thermal stability of the final products as well as the improvement of the storage life of itself.

As for the solvent used for extraction of remaining monomers or washing pre-copolymer in the present invention, a lower alcohol such as methanol, ethanol, propanol, etc. and an aliphatic hydrocarbon such as pentane, hexane, heptane, etc. can be mentioned.

In the case where the copolymerization is carried out in the presence of an initiator, the reaction is stopped at a desired conversion of copolymerization and the copolymerization system is immediately cooled, and then the above-mentioned solvent which dissolves monomeric DAP and TAIC but does not dissolve the pre-copolymer of the present invention is added to the reaction mixture to extract the unreacted DAP and TAIC and to recover the pre-copolymer. The composition of the recovered mixture of unreacted DAP and TAIC by distillation and by extraction followed by distilling off the above-mentioned solvent is easily known by the measurement of the refractive index of the mixture. Because of the difference of the monomer reactivity ratios of DAP and TAIC, the composition of the remaining monomer mixture in the copolymerization system differs from that of the charged monomeric mixture. Accordingly, in the case of using the recovered monomer mixture as the starting material of the next run of copolymerization with the same monomeric composition as the first run, or with another composition, it is necessary to know the actual composition of the recovered monomeric mixture and to correct it to be the desired composition.

Figure 5:
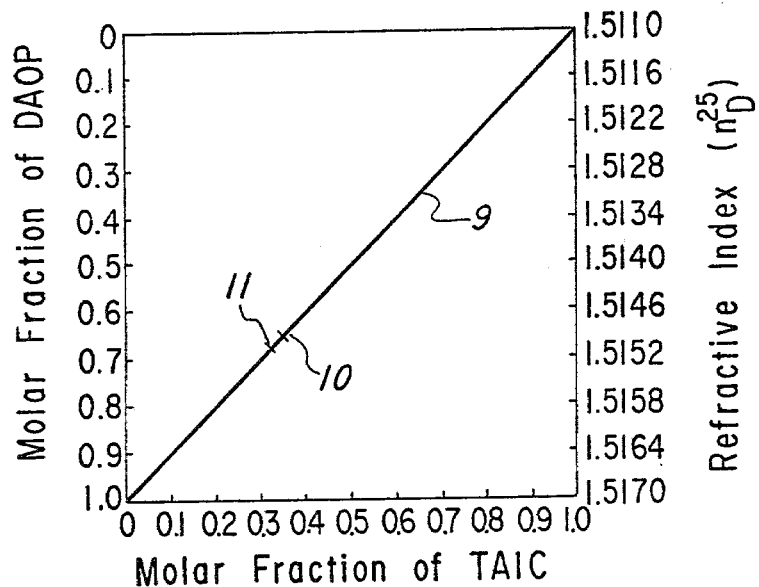
FIG. 5 shows the relationship between the composition of the monomeric mixture of DAOP and TAIC, represented by the molar fraction of TAIC or by the molar fraction of DAOP and the refactive index ($n_D^{25}$) of the monomeric mixture.
Figure 6:
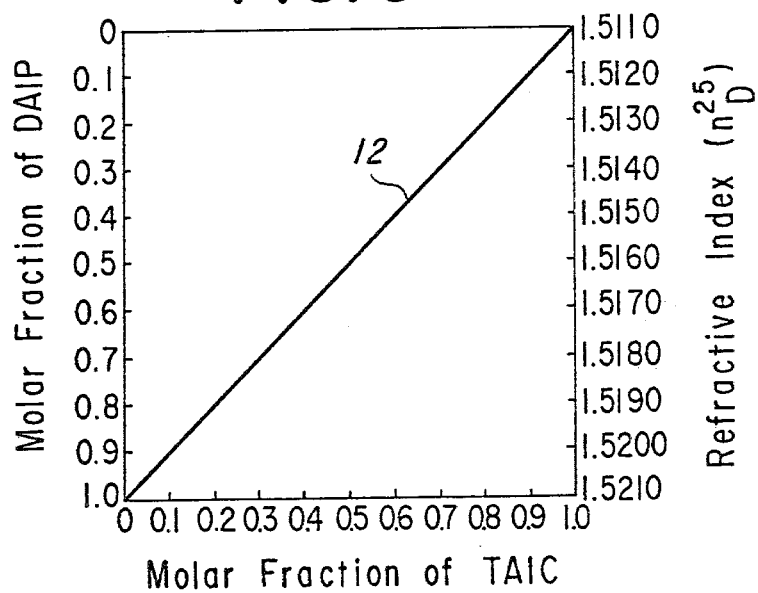
FIG. 6 shows the relationship between the composition of the monomeric mixture (DAIP and TAIC) represented by the molar fraction of DAIP and the refractive index of the monomeric mixture.

In the present invention, the relationship between the composition of the monomeric mixture of DAP and TAIC and the refractive index of the mixture is determined in advance, and the relationship is represented by a calibration curve in a figure such as FIGS. 5 and 6 taking the composition (molar fraction of TAIC of the mixture) in the abscissa and taking the refractive index in the ordinate. Accordingly, the composition of the monomeric mixture is easily corrected by adding either monomer to the mixture while determining the refractive index of the monomeric mixture. Of course, this procedure is possibly applied to the recovered monomeric mixture with a result of possibly utilizing the recovered mixture in the succeeding run of copolymerization.

For instance, as is shown in FIG. 5, the refractive index of a monomeric mixture comprising 1.3 moles of DAOP and 0.7 mole of TAIC, in which molar fraction of DAOP is $0.65 = 1.3/(1.3+0.7)$ and molar fraction of TAIC is $0.35 = 1-0.65$, is indicated by the point 10 on line 9 (calibration curve), i.e., 1.5149. And the refractive index of the monomeric mixture recovered from the reaction mixture of copolymerization carried out on the above-mentioned monomeric mixture showing a refractive index of 1.5149 is represented by the point 11 on line 9 in FIG. 5 which corresponds to 1.5150 and the molar ratio of DAOP:TAIC=67.5:32.5. Accordingly, in the case where the recovered monomeric mixture is to be used in the same copolymerization, a certain amount of TAIC is added to the recovered mixture until its refractive index attains 1.5149.

As mentioned above, according to the method of determination of refractive index of the monomeric mixture, the determination of the composition of the monomeric mixture is extremely simply, speedy and accurately carried out as compared to the hitherto known methods of determination of the DAP units by saponification value and of determination of the TAIC units by nitrogen content measure.

The followings are the explanation of the present invention referring to non-limiting Examples.

EXAMPLE 1

In a reactor provided with a stirrer, a thermometer, a reflux condenser and an oxygen-introducing pipe, 295.5 g (1.2 moles) of DAOP and 199.2 g (0.8 mole) of TAIC were introduced, and under agitation while blowing air into the reactor at a rate of 150 ml/min., a copolymerization was carried out at a temperature of 160° C. for 2 hours. At the end of the run of copolymerization, viscosity of the reaction mixture was 1100 cp (25° C.). After cooling the reaction mixture to the room temperature, it was thrown into 5 liters of methanol and the deposited solid matter of pre-copolymer was separated by filtration under succion. The separated pre-copolymer was washed 3 times with each 100 ml of methanol and dried to be the product of a number average molecular weight of 11,200 (determined by the vapour pressure method on a solution in benzene), of a bromine value of 61 and of a melting point of 150° to 170° C.

The thus obtained pre-copolymer has a molar composition of TAIC:DAOP=48:52 calculated from the nitrogen-content of 8.15% of the pre-copolymer.

In order to verify the uniformity of pre-copolymer composition, the following experiment of fractional precipitation was performed:

Ten grams of the pre-copolymer is dissolved in 50 ml of benzene, and 30 ml of methanol was added slowly to the solution under agitation to deposite the pre-copolymer. After separating the pre-copolymer by centrifugation, it was dried to be 3.6 g in weight. The sedimented substance contained 8.15% of nitrogen and has an average molecular weight of 11,300. In the next step, 30 ml of methanol was added to the filtrate of the centrifugation and after processing as shown above, 2.1 g of the dried sedimented substance was obtained containing 8.16% of nitrogen and showing a number average molecular weight of 11,200.

Furthermore, 100 ml of methanol was added to the second filtrate and after processing as before, 4.2 g of the sedimented substance containing 8.14% of nitrogen and showing a number average molecular weight of 11,000 was obtained.

Since the three sedimented substances obtained by a series of fractional precipitation had almost the same nitrogen contents and average molecular weights, it can be said that the pre-copolymer obtained was a uniform composition consisting of TAIC and DAOP.

EXAMPLES 2 to 11

Using a similar reactor as in Example 1, and performing as in Example 1 to obtain a reaction mixture, the reaction mixture was thrown into 10 times by weight of methanol to separate the pre-copolymer, and the separated pre-copolymer was washed with methanol and then dried. The cases where DAOP and TAIC were copolymerized are in Table 1, and the cases of copolymerization of DAIP and TAIC are shown in Table 2, respectively.

prepolymers of DAOP and of DAIP, respectively obtained by COMPARATIVE Examples 1 and 2 was determined.

TABLE 1

Copolymerization of DAOP and TAIC

| | Reaction Conditions | | | | Properties and Compositions of Pre-copolymer | | | |
|---|---|---|---|---|---|---|---|---|
| No. of Example | Molar ratio (A/B)* | Time min. | Viscosity cp (25° C.) | Yield (%) | Bromine value | Melting point (°) | Average molecular weight | Molar ratio (A/B)* |
| 2 | 67/33 | 90 | 1040 | 18.3 | 81 | over 200 | 13,800 | 72.8/28.2 |
| 3 | 50/50 | 120 | 1040 | 20.4 | 74 | 175–200 | 13,700 | 58.2/41.8 |
| 4 | 35/65 | 110 | 370 | 21.0 | 61 | 124–140 | 9,400 | 42.7/57.3 |
| 5 | 10/90 | 100 | 480 | 22.6 | 46 | 110–128 | 9,300 | 13.8/86.2 |
| 6 | 3/97 | 110 | 440 | 22.0 | 41 | 100–114 | 9,000 | 4.9/95.1 |

Note:
(A/B)* represents TAIC/DAIP

TABLE 2

Copolymerization of DAIP and TAIC

| | Reaction Conditions | | | | Properties and Compositions of Pre-copolymer | | | |
|---|---|---|---|---|---|---|---|---|
| No. of Example | Molar ratio (A/B)* | Time min. | Viscosity cp (25° C.) | Yield (%) | Bromine value | Melting point (°) | Average molecular weight | Molar ratio (A/B)* |
| 7 | 67/33 | 90 | 710 | 20.0 | 83 | 183–220 | 13,000 | 70.8/29.2 |
| 8 | 60/40 | 110 | 620 | 20.8 | 80 | 178–192 | 12,000 | 65.5/34.5 |
| 9 | 50/50 | 120 | 1160 | 21.1 | 78 | 137–159 | 10,000 | 55.9/44.1 |
| 10 | 15/85 | 120 | 720 | 22.1 | 50 | 100–114 | 9,800 | 21.2/78.8 |
| 11 | 6/94 | 100 | 490 | 21.6 | 43 | 80–92 | 9,000 | 4.9/95.1 |

Note:
(A/B)* represents TAIC/DAIP

No change of the average molecular weight was observed on the pre-copolymer preserved at room temperature for 3 months after copolymerization.

COMPARATIVE EXAMPLE 1

Using a similar reactor to that used in Example 1, and after placing 492 g of DAOP in the reactor, a polymerization was performed under the same conditions and with the same procedures as in Example 1. The viscosity of the reaction mixture after 80 minutes from the start was 480 cp (25° C.). After cooling the reaction mixture to the room temperature, the reaction mixture was thrown into 5 liters of methanol and after processing as in Example 1, 118 g of dried prepolymer was obtained. The prepolymer thus obtained showed a bromine value of 35, a number average molecular weight of 8,500 and a melting point of 102° to 113° C.

COMPARATIVE EXAMPLE 2

Using a similar reactor to that used in Example 1, and after placing 492 g of DAIP in the reactor, a polymerization was performed under the same conditions and with the same procedures as in Example 1. The viscosity of the reaction mixture after 100 minutes from the start was 560 cp (25° C.). After cooling the reaction mixture to the room temperature, the reaction mixture was thrown into 5 liters of methanol and after processing as in Example 1, 120 g of prepolymer was obtained. The thus obtained prepolymer showed a bromine value of 46, a number average molecular weight of 9,000 and a melting point of 77° to 94° C.

TEST OF THERMAL STABILITY

Thermal stability of the specimens prepared according to the following composition shown in Table 3 and conditions of molding by using the pre-copolymers obtained by Examples 4, 5, 6, 9, 10 and 11, and the

| Composition for Molding Powder | |
|---|---|
| Material | Amount (Part by weight) |
| Prepolymer or Pre-copolymer | 100 |
| Talk | 100 |
| Dicumyl peroxide | 1 |

Talk and dicumyl peroxide as a catalysator were mixed well with the pre-copolymer or prepolymer and compression molded to be a specimen with a size of 90×10×3 mm under the respective conditions shown in Table 4.

TABLE 4

| Conditions of Compression Molding | | | |
|---|---|---|---|
| Pre-copolymer by Example No. | Temperature (°C.) | Pressure (kg/cm²) | Time (min.) |
| 4 | 160 | 100 | 5 |
| 5 | 160 | 80 | 5 |
| 6 | 160 | 60 | 5 |
| Comparative Example 1 | 160 | 60 | 5 |
| 9 | 160 | 100 | 5 |
| 10 | 160 | 80 | 5 |
| 11 | 160 | 60 | 5 |
| Comparative Example 2 | 160 | 60 | 5 |

In the above-mentioned conditions, the molding pressure of 100 kg/cm² applied on the pre-copolymers obtained respectively in Examples 4 and 9 was necessary due to the higher melting point and the low flow property of the precopolymers, however, it is considered there are no difficulty concerning the thermal stability of the molded products.

RESULTS OF THE TEST OF THERMAL RESISTANCE

The temperature of the test, the time period of test and the weight loss of the specimens after the test are shown in Table 5.

TABLE 5

| | | Results of Thermal Resistance Test | | | | |
|---|---|---|---|---|---|---|
| Origin of | Test temperature | Weight loss of the specimen Duration (hour) | | | | |
| Pre(co)polymer | (°C.) | 50 | 200 | 400 | 600 | 800 |
| Example 4 | 200 | 0.35 | 0.55 | 0.75 | 0.95 | 1.25 |
| Example 5 | 200 | 0.55 | 1.27 | 2.25 | 3.22 | 4.22 |
| Example 6 | 200 | 0.69 | 1.55 | 2.73 | 3.80 | 5.10 |
| Comparative Example 1 | 200 | 0.75 | 1.74 | 3.10 | 4.48 | 6.45 |
| Example 9 | 220 | 0.30 | 0.55 | 0.71 | 1.02 | 1.50 |
| Example 10 | 220 | 0.35 | 0.95 | 1.50 | 2.21 | 3.12 |
| Example 11 | 220 | 0.38 | 1.10 | 1.98 | 3.55 | 6.03 |
| Comparative Example 2 | 220 | 0.45 | 1.25 | 2.60 | 5.20 | 8.20 |

As is seen in Table 5, the weight loss of the specimen prepared from the pre-copolymers of the present invention is smaller than that of the specimen prepared from the prepolymers (produced in Comparative Examples), that is, the pre-copolymers of the present invention contributes the thermal resistance of the finished product better than the conventional prepolymer.

EXAMPLE 12

In a reactor provided with a stirrer, a thermometer, a reflux condenser and an oxygen-introducing pipe, 369.4 g (1.5 moles) of DAOP and 124.5 g (0.5 mole) of TAIC were introduced, and under agitation while blowing air into the reactor at a rate of 150 ml/min., a copolymerization was carried out at a temperature of 160° C. Since the refractive index ($n_D^{25}$) of the reaction mixture became 1.5309 corresponding to the conversion polymerization of about 25% which is known from the calibration curve (line 1 in FIG. 1) obtained by the same copolymerization carried out in advance, after 95 minutes from the beginning of the copolymerization. Then the supply of air was stopped, and the temperature of the reaction mixture was reduced to 140° C. by external cooling. The reaction mixture was then distilled at a reduced pressure of 0.3 mmHg to recover 230 g of monomeric mixture of DAOP and TAIC. After cooling the distillation residue, 800 ml of methanol was poured into the distillation residue under agitation to precipitate the thus formed pre-copolymer as a solid. After filtering the solid pre-copolymer by succion, the solid pre-copolymer was washed 3 times with each 50 ml of methanol and then dried to obtain 123.5 g of precopolymer of a number average molecular weight of 9,000 of a bromine value of 56, of a melting point of 130° to 148° C. and of the molar composition of DAOP:TAIC of 68.4:31.6. On the other hand, the filtrate of the precipitated pre-copolymer and methanol washing of solid pre-copolymer were combined and distilled to remove methanol resulting 140.4 g of a mixture of DAOP and TAIC. Thus, the recovered monomeric mixture was 370.4 g = 230 g + 140.4 g and showed a refractive index ($n_D^{25}$) of 1.5156 corresponding to the molar composition of DAOP:TAIC = 77.2:22.8, known from the calibration curve (line 9 in FIG. 5).

EXAMPLE 13

In a similar reactor as in EXAMPLE 12, 320.1 g of DAOP (1.3 moles) and 174.3 g of TAIC (0.7 mole) were introduced and copolymerization was carried on the above-mentioned monomeric mixture under the same conditions as in Example 12. The copolymerization was then stopped when the refractive index ($n_D^{25}$) of the reaction mixture attained to 1.5284 corresponding to the yield of copolymerization of about 22% known from the calibration curve (line 2 of FIG. 1) by stopping the supply of air and reducing the temperature of the reaction mixture to 140° C. By distilling the cooled reaction mixture at a pressure of 0.3 mmHg, 190 g of monomeric mixture were recovered. By treating the distillation residue with the same procedure as in Example 1, 109 g of pre-copolymer were obtained. This pre-copolymer has a number average molecular weight of 10,000, a bromine value of 63, a melting point of 135° to 143° C. and the composition of monomer units of DAOP:TAIC = 56.2:43.8 without containing unreacted DAOP and TAIC at all. The recovered monomeric mixture from vacuum distillation, that from the precipitation of the pre-copolymer and that from the washing of the pre-copolymer were combined as in Example 1, and the combined monomeric mixture showed a refractive index ($n_D^{25}$) of 1.5148 corresponding to the molar ratio of DAOP:TAIC = 67.5:32.5 known from the calibration curve (line 9 in FIG. 5).

After adding 61.9 g of DAOP and 48.5 g of TAIC to the recovered monomeric mixture (384 g) to have the same monomeric mixture as in the first run of this Example 13, the copolymerization was carried out under the same conditions as in the first run to obtain 110 1 g of pre-copolymer of a number average molecular weight of 9,800, of a bromine value of 63, of a melting point of 136° to 144° C. and of a content of TAIC units of 44.0%.

Another run of copolymerization was carried out under the same conditions as in the first run, however, without carrying out the distillation, and instead 2,500 ml of methanol were poured into the reaction mixture under agitation. The thus deposited somewhat viscous solid was separated from the supernatant liquid by decantation and after adding further 500 ml of methanol to the separated solid the mixture was stirred and the solid in the mixture was crushed. After leaving the mixture until the crushed solid precipitated, the supernatant liquid was removed by decantation and 500 ml of methanol were added to the precipitate and the mixture was agitated and filtered by suction. The solid on the filter was washed 3 times with each 100 ml of methanol and then dried to obtain 113.3 g of pre-copolymer containing 3.8% by weight of a mixture of unreacted DAOP and TAIC.

EXAMPLE 14

In the reactor same as in Example 12, 246.2 g (1.0 mole) of DAOP and 249 g (1.0 mole) of TAIC were placed and copolymerization was carried out under agitation while blowing air into the reactor at a rate of 150 ml/min. at a temperature of 170° C. After reacting for 100 min., the refractive index ($n_D^{25}$) of the reaction mixture became 1.5287 corresponding to the yield of polymerization of 24% as is shown in the calibration curve (line 3 in FIG. 1). Supply of oxygen was stopped and the temperature was reduced to 140° C. by cooling. The cooled reaction mixture was distilled at a reduced pressure of 0.3 mmHg to recover the unreacted monomer mixture amounting to 260 g. Seven hundred milliliters of methanol was added into the cooled residue of distillation under agitation to form the solid precipitate. After filtration of solid filtrate, it was washed 3 times with after 50 ml of methanol and then dried to give 118.9 g of a precopolymer of a number average molecular weight of 9,400, of a bromine value of 74 of a melting point of 175° to 200° C. of a molar ratio of DAOP:-TAIC=41.9:58.1. The combined recovered monomeric mixture showed the refractive index ($n_D^{25}$) of 1.5142 corresponding to the molar ratio of DAOP:-TAIC=52.6:47.4 as is shown in the calibration curve (line 9 in FIG. 5).

EXAMPLE 15

In a reactor quite similar to that of Example 1, 369.3 g of DAIP (1.5 moles) and 124.5 g of TAIC (0.5 mole) were placed and copolymerization was carried out on the monomeric mixture under the same conditions as in Example 12. After 90 min. of the reaction, the refractive index ($n_D^{25}$) of the reaction mixture attained to 1.5341 corresponding to the yield of copolymerization of about 25% as is shown in the calibration curve (line 4 in FIG. 2). Supply of oxygen was stopped and the reaction temperature was reduced to 140° C. by cooling at this point. The cooled reaction mixture was distilled at a reduced pressure of 0.3 mmHg to recover the unreacted monomeric mixture of DAIP and TAIC amounting to 250 g. After cooling the destillation residue, 750 ml of methanol was poured into the residue under agitation and the deposited solid matter was separated by filtration under suction. After washing the separated filtrate 3 times with each 100 ml of methanol, the filtrate was dried to be 123 g of pre-copolymer of a number average molecular weight of 9,200, of a bromine value of 66, of a melting point of 101° to 113° C. and of molar ratio of DAIP:TAIC=69.9:30.1. The thus pre-copolymer did not contain any unreacted monomer. The refractive index ($n_D^{25}$) of the combined recovered monomeric mixture was 1.5187 corresponding to the molar ratio of DAIP:TAIC=76.7:23.3 as is shown in the calibration curve (line 12 in FIG. 6). To the recovered monomeric mixture amounting to 370 g, 111.5 g of DAIP and 12.3 g of TAIC were added to give a molar ratio of the starting monomeric mixture at the first run, and the copolymerization was carried out under the same conditions and procedures as in the first run to obtain 123 g of the pre-copolymer of a number average molecular weight of 9,400, of a bromine value of 66, of a melting point of 102° to 110° C. and of a molar ratio of DAIP:-TAIC=69.9:30.1.

EXAMPLE 16

In a reactor similar to that in Example 12, 246.2 g (1.0 mole) of DAIP and 249 g (1.0 mole) of TAIC were placed and copolymerization was carried out on the monomeric mixture under the same conditions and procedures as in Example 12 but for the reaction temperature of 170° C. Since after 90 min. of the reaction, the refractive index ($n_D^{25}$) attained to 1.5310 corresponding to the yield of copolymerization of 25.5% as is shown in the calibration curve (line 5 in FIG. 2), the supply of air was stopped and the reaction mixture was cooled to a temperature of 140° C.

Then the cooled reaction mixture was distilled under a reduced pressure of 0.3 mmHg to recover 260 g of the unreacted monomeric mixture. After cooling the distillation residue, 700 ml of methanol was poured into the residue under agitation, and the deposited solid was separated by filtration under suction. The solid was washed 3 times with each 100 ml of methanol and then dried to obtain 126.3 g of the pre-copolymer of a number average molecular weight of 9,500, of a bromine value of 79, of a melting point of 132° to 150° C. and of a molar ratio of DAIP:TAIC=44.3:55.7.

The refractive index ($n_D^{25}$) of the combined recovered monomeric mixture was 1.5154 corresponding to a molar ratio of DAIP:TAIC=52.0:48.0 as is shown by the calibration curve (line 12 in FIG. 6).

EXAMPLE 17

In a reactor similar to that used in Example 12, 369.3 g (1.5 moles) of DAIP and 124.5 g (0.5 mole) of TAIC were placed and copolymerization was carried out on the monomeric mixture under the same conditions and procedures. Since after 90 min. of reaction, the viscosity of the reaction mixture became 1800 cp (25° C.) corresponding to the yield of copolymerization of about 25% as is shown in the calibration curve (line 6 in FIG. 3), the supply of oxygen was stopped and the reaction mixture was cooled to a temperature of 140° C. The cooled reaction mixture was distilled under a reduced pressure of 0.3 mmHg to recover the unreacted monomeric mixture amounting to 250 g. To the distillation residue, methanol of 3 times by weight of the residue was poured under agitation to deposite a solid, and the solid was separated by filtration under suction and dried to obtain 128.5 g of powdery pre-copolymer still containing 4% by weight of the unreacted monomeric mixture of DAIP and TAIC.

For the purpose of comparison, the above-mentioned copolymerization was repeated on a newly prepared monomeric mixture under the same conditions, however, instead of distilling the unreacted monomeric mixture, methanol of 5 times by weight of the reaction mixture was poured into the reaction mixture under agitation to obtain a viscous liquid depositing at the bottom of the reactor. After removing the supernatant clear liquid by decantation, methanol was removed from the remaining viscous liquid by distillation under a reduced pressure, and the still remaining matter was dried to obtain 143 g of a semi-solid matter containing 13.5% by weight of the unreacted monomeric mixture of DAIP and TAIC.

EXAMPLE 18

In a reactor similar to that used in Example 12, 295.5 g (1.2 moles) of DAIP and 199.2 g (0.8 mole) of TAIC were placed and copolymerization was carried out under the same conditions and procedures as in Example 12. Since after 120 min, of the reaction, the viscosity of the reaction mixture became 540 cp (25° C.) showing that the yield of copolymerization attained to about 22% as is informed by the calibration curve (line 7 in FIG. 3), the supply of oxygen was stopped and the reaction mixture was cooled to a temperature of 140° C., and then the reaction mixture was distilled under a reduced pressure of 0.3 mmHg to recover 280 g of the monomeric mixture of DAIP and TAIC. To the distillation residue, methanol of 3 times by weight of the residue was poured under agitation to deposit a solid matter. The solid matter was separated by filtration under suction and then dried to obtain 113.3 g of a powdery pre-copolymer containing 3.8% by weight of an unreacted monomeric mixture of DAIP and TAIC.

For the purpose of comparison, the above-mentioned copolymerization was repeatedly carried out, however, instead of distilling the unreacted monomeric mixture, methanol of 5 times by weight of the reaction mixture was poured into the reaction mixture under agitation to obtain a deposition of a viscous liquid. After removing the supernatant liquid by decantation and removing methanol from the remaining viscous liquid at a reduced pressure, 123.6 g of a somewhat viscous semi-solid matter was obtained. The semi-solid matter contained 11.8% by weight of the unreacted (monomeric mixture of DAIP and TAIC).

EXAMPLE 19

In a reactor similar to the used in Example 12, 369.4 g (1.5 moles) of DAIP and 124.5 g (0.5 mole) of TAIC were placed, and after adding 2.47 g of benzoyl peroxide to the monomeric mixture and introducing gaseous nitrogen from the pipe for blowing oxygen in Example 12, copolymerization was carried out at a temperature of 80° C. in the atmosphere of gaseous nitrogen on the monomeric mixture. After 120 min. of the reaction when the refractive index ($n_D^{25}$) of the reaction mixture became 1.5308 corresponding to the yield of copolymerization of about 22% as is shown in the calibration curve (line 8 in FIG. 4), the reaction mixture was cooled to the room temperature and poured into 2,500 ml of methanol under agitation. The deposited solid was separated by filtration under suction and washed 3 times with each 100 ml of methanol, and then dried. The thus obtraned pre-copolymer, weighing 98.8 g, had number average molecular weight of 11,000, bromine number of 65, a melting point of 113° to 119° and molar ratio of DAIP:TAIC=69.4:30.6.

What is claimed is:

1. A pre-copolymer comprising either diallyl orthophthalate units or diallyl isophthalate units and triallyl isocyanurate units, and having a melting point of 50° to 200° C. and a number average molecular weight of 5,000 to 15,000, the molar ratio of diallyl orthophthalate units to triallyl isocyanurate units in said pre-copolymer being in the range of from 95:5 to 40:60, or the molar ratio of diallyl isophthalate units to triallyl isocyanurate unites in said pre-copolymer being in the range of from 95:5 to 30:70.

2. A process for producing a pre-copolymer consisting of either diallyl orthophthalate units or diallyl isophthalate units and triallyl isocyanurate units by heating and copolymerizing a monomeric mixture of diallyl orthophthalate or diallyl isophthalate and triallyl isocyanurate, wherein the molar ratio of diallyl orthophthalate units to triallyl isocyanurate units is the range of 95:5 to 40:60, or wherein the molar ratio of diallyl isophthalate units to triallyl isocyanurate units is in the range of 95:5 to 30:70, at a temperature of 100° to 200° C. in the presence of molecular oxygen blown into the reaction system or in the presence of a polymerization initiator selected from the group consisting of lauroyl peroxide, benzoyl peroxide and azobis-isobutylonitrile.

3. A process according to claim 2, wherein after stopping the copolymerization by a known method, unreacted monomer comprising diallyl orthophthalate or diallyl isophthalate and triallyl isocyanurate is recovered from the reaction mixture by distillation under reduced pressure leaving a distillation residue; a solvent which dissolves the above-mentioned monomers, but does not dissolve said precopolymer is added to the distillation residue to separate said precopolymer, forming a mother liquor; and the thus separated precopolymer is isolated from the mother liquor comprising said solvent and the still remaining monomeric mixture of diallyl orthophthalate or diallyl isophthalate and triallyl isocyanurate.

4. A process according to claim 3, wherein the degree of conversion of said pre-copolymer is determined by stopping copolymerization at a point when the pre-copolymer shows a predetermined unique viscosity or refractive index corresponding to the above-mentioned conversion derived by observing the unique relationship between the degree of conversion and the viscosity or the refractive index of said pre-copolymer.

5. A process according to claim 4, wherein said adjustment of the composition of the monomer mixture of diallyl orthophthalate or dially isophthalate and triallyl isocyanurate is performed utilizing the predetermined relationship between the refractive index of said monomer mixture and the composition of said monomer mixture.

6. A process according to claim 3, wherein said still remaining monomeric mixture is said mother liquor is recovered, the amounts of diallyl orthophthalate or diallyl isophthalate and triallyl isocyanurate in the recovered monomeric mixture are adjusted to their starting levels by adding the necessary amount of monomers, and the thus adjusted monomeric mixture is returned to said copolymerizing step.

* * * * *